Oct. 4, 1949.  A. C. SCHICKLER  2,483,939
PILOT AND BURNER CONTROL
Filed Feb. 27, 1946  3 Sheets-Sheet 1
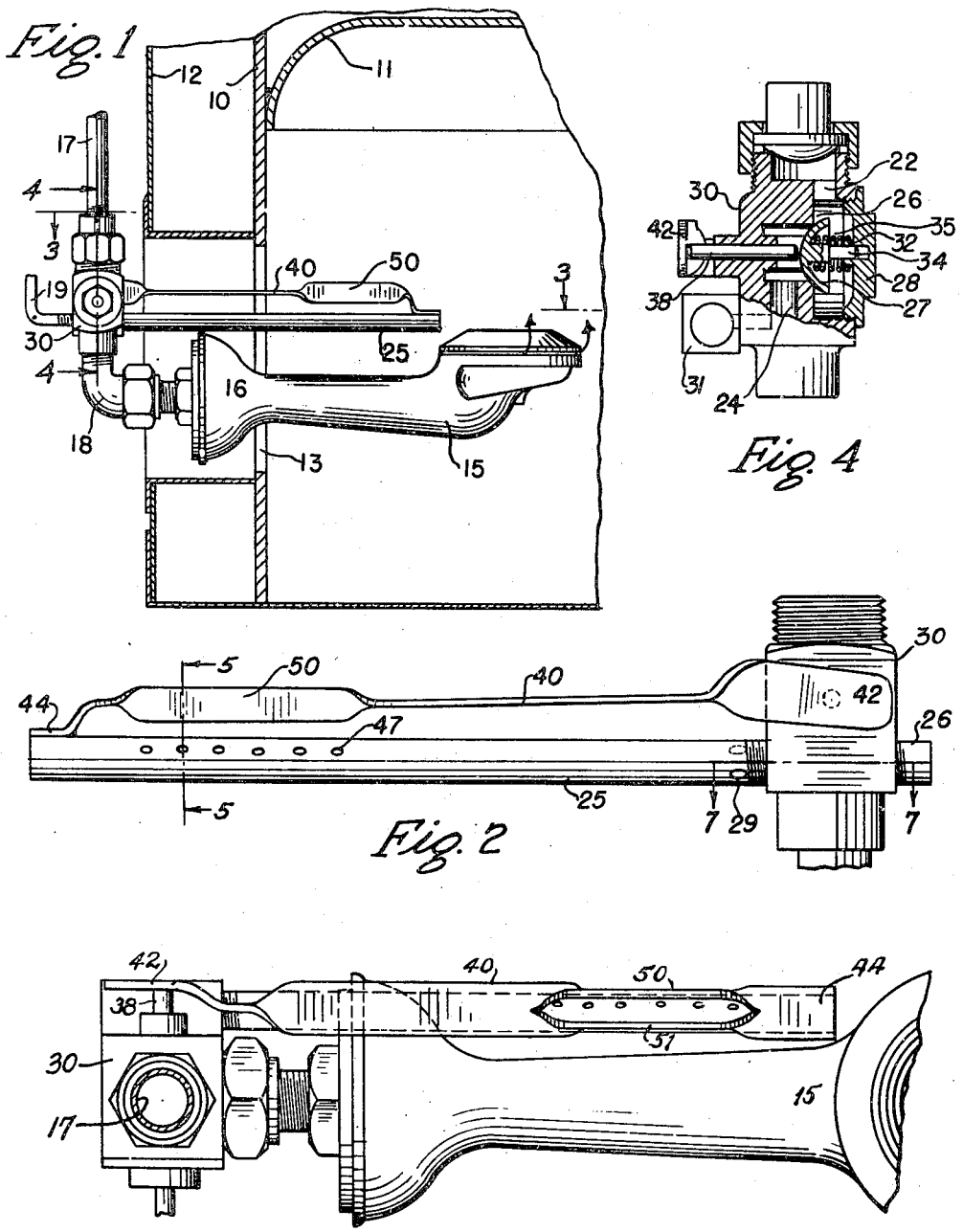
INVENTOR.
ALBERT C. SCHICKLER
BY
Justin W Macklin,
ATTORNEY.

Oct. 4, 1949.   A. C. SCHICKLER   2,483,939
PILOT AND BURNER CONTROL
Filed Feb. 27, 1946   3 Sheets-Sheet 2

INVENTOR.
ALBERT C. SCHICKLER,
BY
Justin W. Macklin
ATTORNEY.

Oct. 4, 1949. A. C. SCHICKLER 2,483,939
PILOT AND BURNER CONTROL
Filed Feb. 27, 1946 3 Sheets-Sheet 3

INVENTOR.
ALBERT C. SCHICKLER,
BY
Justin W. Machlin
ATTORNEY.

UNITED STATES PATENT OFFICE 2,483,939

PILOT AND BURNER CONTROL

Albert C. Schickler, Cleveland, Ohio

Application February 27, 1946, Serial No. 650,688

5 Claims. (Cl. 158—117.1)

My invention relates to a thermal element for controlling valves, such as for pilot light for burners, and the like.

Its general object is to provide a thermal element which may respond to temperature changes due to presence or absence of pilot burner flame, and which shall very quickly respond to exert exceptionally high power with a large movement of its operative end.

The present safety requirements demand a safety cut-off of the gas supply within three minutes after failure and extinguishment.

A bimetallic operative element being the same temperature through both of its components responds to temperature change only as the entire element cools which, in turn, is dependent upon the change in ambient temperature in the burner chamber.

Thus, a bimetal controlling element responsive only to temperature increment may operate too slowly, both for the effective and simple relighting as well as for shutoff after flame failure.

Prior to my invention there has been no satisfactory direct action thermal element control giving sufficient power and amount of movement and operating quickly enough to meet the requirements.

It is recognized that a monometallic element differs from the bimetal temperature-increment-responsive bimetal, in that it may have its action responsive to a differential between two more or less separated portions of the single metal piece, and is thus responsive to the presence of the flame, because whatever the ambient temperature, its motion is dependent upon the differential between the hot and cool activating portions.

By my invention I am enabled to provide a monometallic direct action thermal element responsive to the differential due to the presence or absence of the flame applied to one part, and which operates through a substantial distance exerting considerable power, and whatever the ambient temperature, it will effectively respond for a complete cycle of turning on and off within thirty-five to forty seconds.

Another object is to so arrange such an element that it is certain to so operate the valves as to cause safe failure, or as is commonly said, "to fail safe."

In pilot and burner control valve arrangements, it is often desirable to operate two valves consequent upon one movement of a thermal element, following failure of the light or flame of the pilot. Because of the exceptional power developed by my novel form of thermal element, I am able to deliver actual opening movement and permit closing movement of two or more valves without in any way overburdening or retarding the effective actuation of the thermal element.

Another object of the invention is to construct a thermal element of this nature, which may be very cheaply manufactured, durable in use and certain in operation, and having no parts likely to get out of order.

A specific object is to afford convenience of operation of electrical contacts, if desired, without interfering with the physical operation of valves by the thermal element.

A preferred form of my thermal element is made from a single strip of metal, of one kind, and having a portion of its length split and the sections at either side of the split being turned at right angles to the plane of the rest of the strip, to provide relative pushing and pulling elements responsive to heat differential between them, and which may swing the free end of the strip through a substantial movement in the plane of the strip, i. e., at right angles to the planes of the separated portions.

I prefer to anchor the strip firmly adjacent to one end of the split portions and extend the strip a considerable distance from the other end of the separated portions, increasing the movement of the free end.

Another object is to so form the joining portions between the heat differential members and the strip that a multiplication of movement is effected in a ratio greater than that of the length of the strip times the distance separating the heat responsive arms.

In carrying out this last named object, I have been able to attain movement comparable to angular displacement of bimetal elements, and I attain structural strength and force delivered edgewise of the strip far in excess of bimetallic elements.

The above and other objects will become more apparent from the following description which relates to the drawings illustrating the preferred form of my thermostatic element, and illustrates its use in pilot burner control.

Fig. 1 is a side elevation of a gas burner and safety pilot associated therewith, shown as installed in connection with a hot water tank, parts of which appear in section.

Fig. 2 is a top plan view of the pilot burner and valve casing therefore with the thermal element shown in elevation.

Fig. 3 is a top plan view of the main burner and pilot safety valve, looking down on the thermal element.

Fig. 4 is a detail sectional view of the valve structure through which gas is supplied to the main burner, and illustrating part of the safety pilot arrangement.

Figure 5:
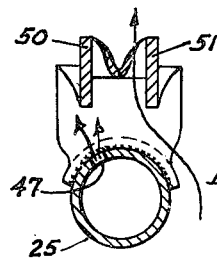
Fig. 5 is an enlarged sectional detail through the thermal element and pilot burner tube, as indicated by the line 5—5 of Fig. 2.
Figure 6:
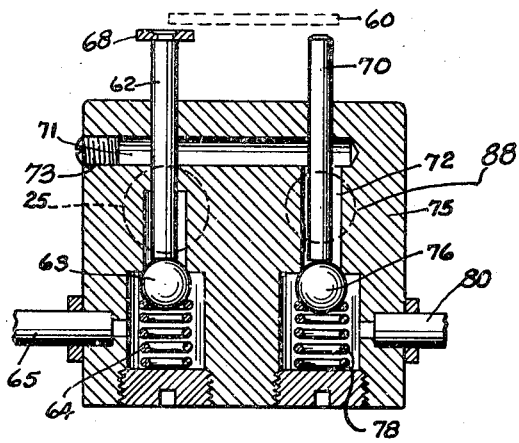
Fig. 6 is a sectional detail through the valve housing having two valves in the control system.

For most effective use of the present invention, it is desirable to provide a comparatively large valve passage with a wide opening, so that when the valve is opened to supply fuel to the burner 15 there will be comparatively little drop in pressure delivered to the burner.

An advantage of my thermal element is that of adequate power and movement to actuate such a valve.

In the drawings, 10 indicates a hot water tank having a crown bottom member 11 and an outer jacket 12, and through a suitable side opening 13, through the tank portion 12 and insulating jacket, is provided for a burner 15 having the usual mixer 16 and feed pipe 18.

These parts are illustrative of a burner use with which my safety pilot may be used.

A pilot burner 25 adjacent the main burner is carried on the valve block or housing 30, Figs. 1 and 4, or 75 Figs. 6 and 8. The pilot burner has a separate supply passage from the line 19 under the control of a manually operated valve not shown.

Various forms of hookup connections and mechanisms between the thermostat in a hot water heater, a main valve in the gas supply line and pilot burner control systems are well known, and my device is obviously adapted for use in any of them.

The pilot tube 25 is shown as rigidly mounted in the valve housing 30, although it may be mounted in any suitable fashion whereby it is fixed with relation to the main burner and is sufficiently rigid to carry a valve closing thermo-responsive actuating member, here shown as comprising a bar 40 having a valve actuating head 42 and welded or otherwise secured at 44 to the burner end of the pilot tube.

Figure 8:
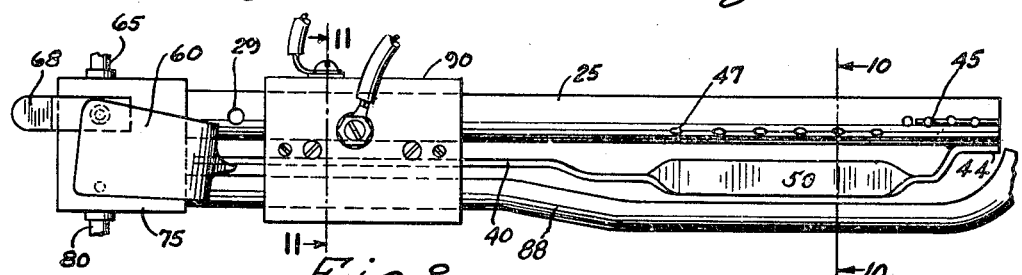
Fig. 8 is an enlarged plan view of the pilot burner and its thermal element and associated parts.
Figure 9:
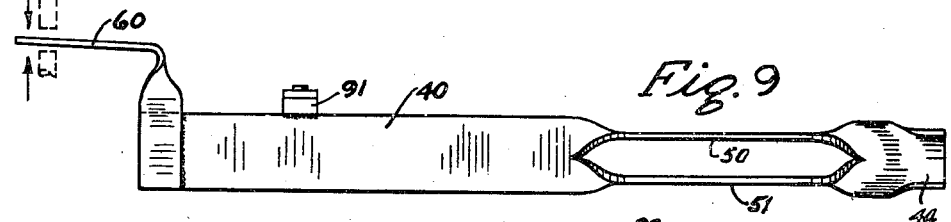
Fig. 9 is a side elevation, on the same scale, of the modified form of thermal element, shown in Fig. 8.
Figure 10:
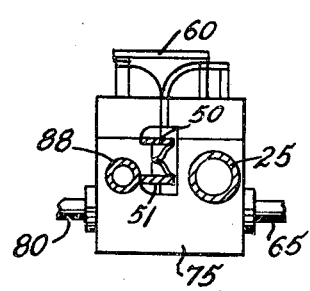
Fig. 10 is a sectional detail on a plan indicated by the line 10—10 of Fig. 8.
Figure 11:
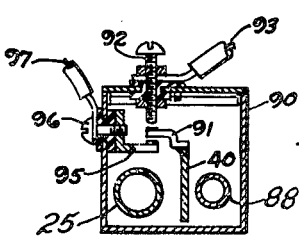
Fig. 11 is a sectional detail through an electrical contact attachment, as indicated by the line 11—11 of Fig. 8.

Suitable pilot flame openings best seen in Fig. 8 are indicated at 45, while a series of openings 47 are arranged to deliver flame to one arm 50 of the pair of arm 50 and 51. These arms 50 and 51 are shown as separated integral bridging members between the welded end portion 44 and the flat reach portion 40 of the strip to which the valve actuating head is attached. Thus it will be seen that the arms 50 and 51 are integral with the bar strip 40 and are formed intermediate the ends of this strip.

The bar 40 and arms 50 and 51 with the secured end 44 and valve head 42 are preferably all formed of one piece of acid-resisting rigid material, such as stainless steel.

The head portion may or may not be integral, as will later appear.

In operation under normal conditions the pilot flame is burning and the jets from the openings 47 directed to the bridge arm 50 raise the temperature of that arm relatively higher than its companion, which is out of this narrow flame zone and is cooled by passage of air over the other side of the tube and between the arms.

In an ambient temperature of, say 300° to 600° F., the differential temperature to which the bridge arms are subjected may be several hundred degrees, with the result that the hotter arm expands more than its companion, thus normally moving the head 42 in a direction to hold the main valve open.

Upon failure of the main burner and failure of gas supply so that the pilot is extinguished, the relative temperature between the two arms tends to equalize as the formerly hot bridge arm cools, with the result that the strip 40 is swung in the opposite direction, releasing its pressure on the main valve and permitting it to close by spring action, as is the required operation in the "fail safe" operation.

The valve 30 as shown has an inlet passage 22 communicating with the supply pipe 17 and an outlet passage 24 communicating with the feed pipe 18 to the burner 15. Between these passages the valve has an annular seat 26. A valve proper 27, having a seating face substantially in the shape of a part of the surface of a sphere, cooperates with the seat 26. A cap 28 closes one side of the valve body and has an inwardly projecting tubular extension 32 into which slidably projects a valve stem 34. A spring 35 bearing against the cap and the valve 27 tends to yieldingly hold the valve in closed position.

Slidably extended through the wall of the casing of the valve 30 on the side opposite the cap 26 is a valve opening pin 38 which bears against the valve 27.

In the operation of my improved pilot valve and thermal element, a valve (not shown) is opened to allow flow of fuel through the pipe 19 to the pilot burner tube 25, and the pilot is lighted. The valve proper 27 is normally held seated by the spring 35.

It will be seen that there will be a flame at the end of the pilot burner tube and at the holes 47. The flame provided by the burning gas emitted by the holes 47 will impinge upon the bridge arm 50, as indicated in Fig. 5.

The arrows from the openings 47 indicate the flame directed to the bridge member 50, and it will be readily seen that rising air passing around the right hand side of the pipe 25 and upwardly over the companion bridge member 51 will maintain the member 51 at comparatively lower temperature.

As is later more fully described, expansion of the arm 50 swings the head 42, actuating the pin 38 and causing it to fully open the valve 27 against the tension of the spring 35.

When the valve 27 is opened, fuel will flow from pipe 17, past the valve to the burner 15, where it will be lighted by the pilot flame. The gas supply to the pilot flame is independent of the valve controlling the main burner. If, for any reason, the pilot flame goes out, the thermal element will return to its normal position, the valve 27 will be closed, and the supply of fuel to the burner 15 will be cut off.

In Figs. 6 to 10 I have shown modified arrangements of the pilot burner control in which two separate valve controlling stems or pins may be actuated by the same thermostatic arm by providing a widened member 60 bridging across two valve pins 62 and 70.

The valve pin 62 is slidable inwardly (downwardly in Fig. 6) to unseat a ball valve 63 normally held to its seat by a coil spring 64 enclosed in a passage from the tube 65 to the burner pipe 25.

From the main supply control valve and subject to the action of the thermostat (not shown) in the hot water tank, a passage 80 leads to the same valve block 75, and it communicates through a passage 72 with the relief pipe 88, under control of a ball valve 76, normally held to its seat by a coil spring 78, corresponding to the spring 64. The valve 76 may be unseated to be opened upon the heating or shut-off motion of the thermostatic arm by the member 60, depressing the pin 70, thrusting it inwardly and unseating the valve 76. Thus, it will be seen that both of these valves would be seated when the thermostatic arm stands away from the valve block 76, in which position it is held when the flame is extinguished, and the arm 50 has so cooled that there is little or no relative difference in temperature between it and the arm 51.

A cross passage 71 closed by a plug 73 serves to pick up leakage above the valve 63 around the pin 62 and carries such escaping gas to the passage 72, and thence to the relief pipe 88.

On the pin 62, I have mounted a finger wing member 68 extending outwardly, downwardly and then outwardly again, from the side of the valve block 75, and by which the valve 63 may be manually opened by depressing the pin for starting the lighting operation.

Reference may be had to my copending application above referred to for more complete description of the embodiment of these parts in the assembly of an operative system.

For the present purpose in this application, it is intended only to indicate the use of two or more controlling valve pins governed by a single thermostatic arm.

Likewise, it is desirable to indicate optional use of electrical contacts, the positions of which are changed by and consequent upon movement of the thermostatic arm. For diagrammatic illustration of this, in Fig. 8, I have shown a housing 90, mounted upon and surrounding the tubes 25 and 80, in such position that the arm 40 extends therethrough.

A contact element 91 on the bar 40 is positioned between the point of a screw 92 connected with the wire indicated at 93 and extended through an insulated collar in the housing 90 to close a circuit at one position of the bar 40. A contact 95 extending beneath the contact member 91 mounted by the screw 96 also extending through an insulated collar connects with a wire 97 for another circuit which may connect with or include other controls not shown.

Figure 7:
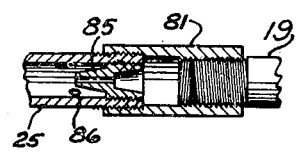
Fig. 7 is a sectional detail showing a preferred construction at the inner end of the pilot burner tube.

The detail in Fig. 7 may be mentioned as indicating a suitable mixer connection, and shows the mounting of the pilot tube 25 and its mixer on or in the main valve block 30, as in Fig. 4. The threaded member 81 corresponds to the tubular block 31 of Fig. 4, thus the mixer member is interposed between the tubular line 19 and the pilot tube.

The supply pipe for the pilot is shown as threaded into a collar 81, the other end of which receives the threads on the end of the tube 25, which is also threaded to receive a nipple 85 terminating adjacent air mixer openings 86. The collar 81 may be rigidly mounted in the valve block 30, or may extend through a separate block 88 affixed to the side of the housing 30, as shown at 31.

Heretofore, in monometallic elements used for such controls, it has been necessary to use motion multiplying mechanisms where direct mechanical action for operating the valves was desired.

Use of electric contacts, which do not have the certainty of operation but which are necessary because only slight movement has resulted from heating one side or portion of a metallic element, involves additional mechanism, such as motors, solenoids, transformers, etc., and at best these are subject to possible failure of electric power supply.

The ideal valve operation for the control of such systems is to get a substantial movement of, say, one-fourth to one-half inch direct actuation from the thermostatic element delivered to a valve operating surface or shoulder rigidly carried by and movable in direct response to the relative expansion and contraction of the thermostatic element.

An essential characteristic and requirement is that the movement should also exert a very substantial pressure, preferably of several pounds at the valve contact.

As would be expected, the leverage applied to the edgewise swing of the integral valve operating arm extending several inches from its connection with the arms 50 and 51 is multiplied in a ratio of the length of the arm to the space between the bridge members. However, I have found that by the novel formation shown I attain even greater multiplication than this ratio.

Figure 12:
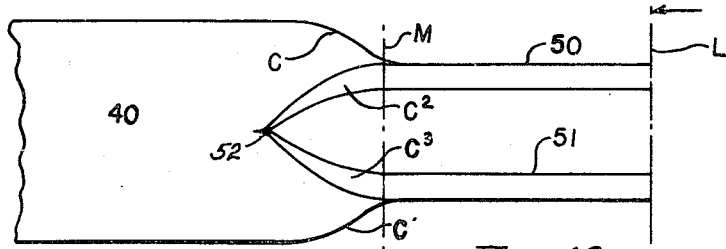
Fig. 12 is a detail showing an enlargement of the junction between the thermo-responsive arms, the valve operating arm diagrammatically illustrating the multiplication of movement imparted to the arm.
Figure 14:
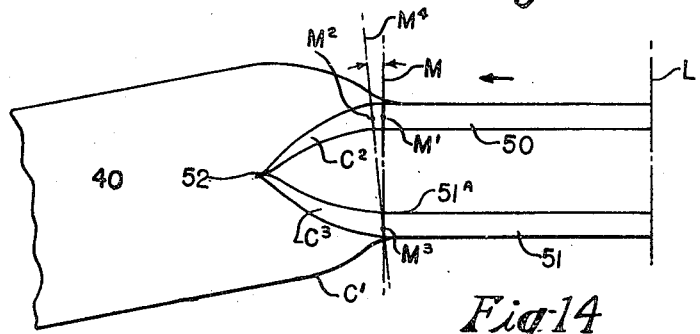
Fig. 14 is a diagram further illustrating the imparting of movement from the thermal element to the operating arm.
Figure 13:
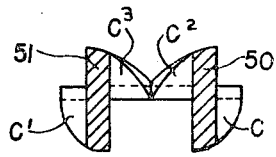
Fig. 13 is a sectional detail taken as indicated by the line 13—13 of Fig. 12.

Figs. 12 and 14 are enlarged details respectively showing the at-rest position and the angular valve opening position due to the expansion of the arm 50 over that of the arm 51.

Figure 15:
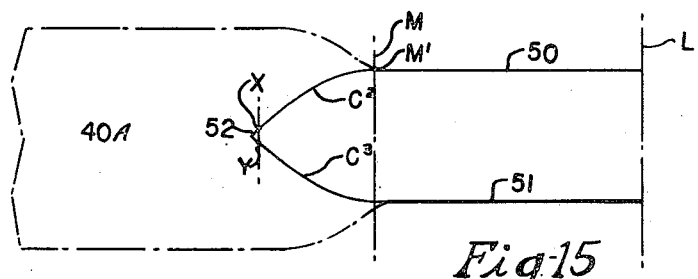
Fig. 15 is a similar diagrammatic view showing by comparison the small movement from the thermal section delivered to the valve operating arm.
Figure 16:
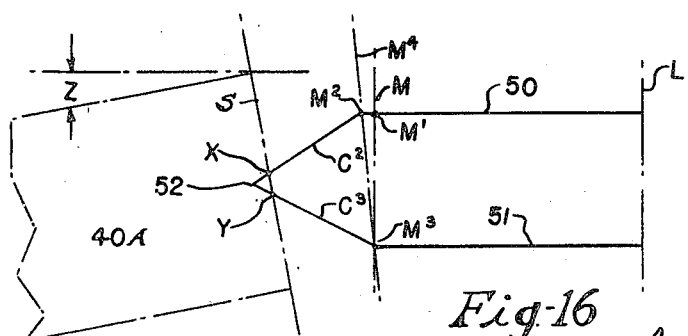
Fig. 16 is a wholly diagrammatic view further illustrating the multiplication of motion from slight relative differential in the thermal section delivered to the lever arm through a third-class lever movement.

Figs. 15 and 16 likewise are intended to show these two positions, respectively, in wholly diagrammatic illustration.

In these views the fixed ends of the arm are shown as extending to the left from a base line L to a line M through the points where the strips, forming the arms 50 and 51, merge with the material of the lever strip 40.

As the bridge arm 50 expands relative to the arm 51, its end, indicated by the point M1, pushes forwardly to a point indicated at M2.

In actual practice this movement may be only a few thousandths of an inch. However, the angle of movement of the arm 40 is substantially greater than the angle between the line M and the line M4 passing through the point M2 and the point M3, after relative extension of this arm 50.

The apparent explanation developed after much study of this phenomena seems to be substantially as follows:

The material at C2 joining the upper edge of the strip 50, and the material at C3 joining 51 with the lever strip 40 form a comparatively rigid pointed arch terminating at 52.

Both sides of this arch are relatively incompressible, while the sinuous portions C and C1 are capable of flexing from their normal set curvature. That is, the portion C may flex to straighten and elongate, while the portion C1 may flex to increase its curvature, and thus relatively shorten.

The stiffness and incompressibility of these portions C2 and C3 seem to deliver the motion due to the relative extension of the arm 50 over that of the arm 51 to the point of the arch.

To further explain the effect found by actual measurements under operating conditions, I have used two comparative diagrams, 15 and 16, corresponding respectively to the positions of Figs. 12 and 14.

In Fig. 15, the arms 50 and 51 are represented in their normal position, and the line M is parallel with the fixed base line L. The rigid arch members C2 and C3 meet at the point 52, while the broken lines 40A indicate the at-rest position of the lever strip.

In Fig. 16 the arm 50 is shown as having been extended more than the arm 51 by an amount indicated by the distance between the points M1 and M2, thus in effect tipping the line M, passing through these two points, to the position indicated at M4. Here, the members C2 and C3 are shown as straight arms intersecting a base line S, which represents the connection with the lever strip 40A at points X and Y close to the point 52 of the arch, here shown as the converging lines C2 and C3.

It will be seen that if the distance of movement from M1 to M2 is transmitted through C2 to the point X, while the point Y remains relatively stationary, the angle of the intersecting line S, and thus the angle of the strip 40A is greater than the angle between the lines M and M4, and the angle of movement between the at-rest position of Fig. 15 and the position of Fig. 16, as indicated at Z, corresponds to the relative displacement of the points X and Y in the angle of tipping of the line S, which is greater than the angle between the lines M and M4.

It will be seen that if the arms 50 and 51 are normally a quarter of an inch apart, and if the length of the lever arm 40A from the joining line M to the valve end of the lever is four inches, the ratio of movement would normally be only that of four inches over a quarter of an inch (i. e., 16 to 1) times the expansion differential or movement of the point M1 to the point M2. Thus, assuming this relative expansion is ten-thousandths of an inch, the end of the lever arm would be expected to move sixteen times this amount or one hundred and sixty-thousandths of an inch (.160").

For a heat differential which should cause a relative extension of the arm 50 over that of the arm 51 of ten-thousandths of an inch, the movement actually delivered to the valve end of the arm is more than three-eighths of an inch. This confirms the explanation of the diagrams that the movement of the lever is as though the expansion were delivered through points X and Y, at approximately one-eighth of an inch apart. Thus, relative expansion of ten-thousandths of an inch, of the arm 50 over that of the arm 51, effective on the points X and Y spaced one-eighth of an inch, is in the ratio of four inches over one-eighth of an inch, or thirty-two to one.

It will be seen ten-thousandths of an inch differential expansion is thus multiplied at the end of the arm 40 by the factor thirty-two, and gives an effective movement of three hundred and twenty-thousandths of an inch at the valve end.

Obviously, the exact location of these theoretical pivot points X and Y is extremely difficult to determine, but the effect shows they must be much closer together than the arms 50 and 51.

In the form shown, the strip 40, made of stainless steel, about five one-hundredths of an inch thick, has the bridge arms 50 and 51 spaced approximately one-fourth of an inch apart, and the split between them is slightly less than two inches long between the points of juncture with the strip.

The overall length from the fixed end to the valve is approximately six inches. In an ambient temperature of 500° F. or more, the differential in temperature between the bridge arms may be normally 600° F. or thereabouts, and the coefficient of expansion is such that about nine-thousandths of an inch extension of the arm 50 over that of the arm 51 is to be expected, and the movement at the valve operating end has been found to be from five-sixteenths to seven-sixteenths of an inch in normal operation.

While my monometallic metal is rigid and for the greater part of its movement may exert ten pounds pressure without strain or distortion, yet it is flexible so that if the movement of the valve end is arrested subsequent tendency to move further does not result in undue strain or distortion.

More rigid elements such as those made of bar or rod stock lack this resiliency with the result that the effective operational movement is limited.

With the element made of the strip shown and described, and with an effective pressure of approximately ten pounds capable of being delivered through, say, three-eighths of an inch, I am enabled to open a valve one-eighth of an inch or more during the first heating interval, at which time the temperature differential between the two arms 50 and 51 is greatest and to continue to exert a pressure holding the valve full open when subsequent ambient temperature reduces the differential. The result is that upon extinguishment of the flame heating the arm 50 and the consequent cooling of both arms to approximately the same temperature gives an effective movement releasing and thus closing the valve, through more than the necessary eighth of an inch.

Effective operation of either opening or closing movement occurs in wide ranges of ambient temperatures, up to as high as approximately 1000° F. and full movement of either opening or closing occurs in fifteen to twenty seconds.

It will be seen that the preferred form of this arm and the manner of making it is extremely simple.

While the bridge arms are preferably formed from a single thin strip of uniform width of stainless steel, the end of which may be bent to form the valve engaging portion, or may have a special end welded or riveted thereon, various modifications may be made without impairing its efficiency and without departing from the spirit of the present invention, as defined in the appended claims.

Having thus described my invention, what I claim is:

1. A thermal element for a safety pilot structure having a main burner, a normally seated valve for controlling flow of fuel to the burner, a pilot burner tube for providing a flame adjacent the main burner, and means for supplying fuel to the pilot burner tube, said thermal element comprising a strip of monometallic flat material, forming a lever arm portion and two substantially parallel spaced actuating strips lying in planes at substantially right angles to the lever arm portion and integral therewith and adapted to swing the arm to act on said valve when subjected to a difference in temperature between the actuating strips, the joining portions between each actuating strip and the lever arm portion being formed of oppositely curved one quarter turns of helicoidal shape.

2. The thermal element described in claim 1 in which the actuating strips also have their ends opposite the lever arm connected to form a supporting and anchoring portion.

3. The thermal element described in claim 1 in which said spaced actuating strip portions are formed intermediate the ends of the strip of monometallic flat material, and in which the end of the strip opposite the lever arm is bent from the direction of the strip to form a supporting and anchoring portion.

4. A thermal responsive device comprising a flat strip of metal formed of one piece and having a lever arm portion and two substantially parallel actuating portions turned at right angles from the plane of the arm portion of the strip, said actuating portions being spaced apart a distance of approximately one half of the width of the strip and each being joined to the strip by a helicoidal curving portion, two of the adjacent edges of the curving portions converging at the median line of the arm portion of the strip and the two opposite edges of the curving portions diverging to the sides of the strip, and whereby the lever arm portion will swing about the curving junction portions as a result of difference in temperature between the two actuating portions.

5. A heat differential operating element comprising a rigid flat strip-like metal lever arm having effective connections integral with spaced apart strips at substantially right angles to and serving to support the lever and adapted to be fixedly anchored at the ends opposite the lever arm, said connections with the lever arm being helicoidal strip portions, the edges of the spaced strips converging and uniting with the lever arm at one side thereof, and the opposite edges of the strips diverging and becoming side edges of the lever arm, said curving portion permitting flexing when the strips are relatively lengthened and shortened by subjecting them to a difference in temperature between them, and whereby the effective leverage is exerted on the lower arm at points closer together than the distance across the space between the strips, and this action on the lever arm functions in the manner of a third-class lever.

ALBERT C. SCHICKLER.

REFERENCES CITED

The following references are of record in the file of this patent:

UNITED STATES PATENTS

| Number | Name | Date |
| --- | --- | --- |
| Re. 22,688 | Higley | Nov. 6, 1945 |
| 477,545 | Howell | June 21, 1892 |
| 1,812,788 | Hurxthal | June 30, 1931 |
| 2,185,436 | Gordon | Jan. 2, 1940 |
| 2,204,791 | Davis | June 18, 1940 |
| 2,362,247 | Converse | Nov. 7, 1944 |
| 2,385,155 | Newell | Sept. 18, 1945 |
| 2,392,065 | Rodgers | Jan. 1, 1946 |
| 2,455,306 | Higley | Nov. 30, 1948 |